United States Patent
Delavalle et al.

(10) Patent No.: US 6,769,727 B2
(45) Date of Patent: Aug. 3, 2004

(54) ASSEMBLAGE OF TWO PIECES OF BODYWORK TO BE JOINED TOGETHER EDGE TO EDGE, AND A PIECE OF BODYWORK BELONGING TO SUCH AN ASSEMBLAGE

(75) Inventors: Dominique Delavalle, Marchon (FR); Francis Cordebar, Veyziat (FR)

(73) Assignee: Compagnie Plastic Omnium, Lyons (FR)

( * ) Notice: Subject to any disclaimer, the term of this patent is extended or adjusted under 35 U.S.C. 154(b) by 0 days.

(21) Appl. No.: 10/125,544

(22) Filed: Apr. 19, 2002

(65) Prior Publication Data

US 2002/0163216 A1 Nov. 7, 2002

(30) Foreign Application Priority Data

Apr. 19, 2001 (FR) ............................................ 01 05329

(51) Int. Cl.⁷ .......................... B62D 25/02; B62D 25/08
(52) U.S. Cl. .......................... 296/29; 296/191; 296/198; 293/120; 293/155
(58) Field of Search ........................ 296/1.1, 29, 146.7, 296/191, 198; 293/1, 102, 108, 120, 121, 142, 141, 155

(56) References Cited

U.S. PATENT DOCUMENTS

| | | | |
|---|---|---|---|
| 3,894,316 A | | 7/1975 | Johnson |
| 4,057,948 A | | 11/1977 | Wise |
| 4,266,386 A | | 5/1981 | Bains |
| 5,108,138 A | * | 4/1992 | Kawaguchi .................. 293/120 |
| 5,226,695 A | * | 7/1993 | Flint et al. ................... 296/191 |
| 5,429,412 A | * | 7/1995 | Schoen et al. ............... 296/191 |
| 5,882,054 A | * | 3/1999 | Devilliers et al. ........... 293/155 |
| 5,957,512 A | * | 9/1999 | Inada et al. .................. 293/102 |
| 6,000,748 A | * | 12/1999 | Tomforde et al. ............. 296/29 |
| 6,010,169 A | * | 1/2000 | Cox et al. .................... 293/120 |
| 6,120,089 A | * | 9/2000 | Kalstiantz et al. ........... 296/191 |
| 6,135,517 A | * | 10/2000 | Cordebar .................... 293/155 |
| 6,209,940 B1 | * | 4/2001 | Jocher et al. ................. 296/29 |
| 6,422,643 B1 | * | 7/2002 | Pease .......................... 296/194 |
| 6,428,074 B1 | * | 8/2002 | Sukegawa et al. ............. 296/29 |
| 6,435,602 B1 | * | 8/2002 | Sukegawa et al. .......... 296/191 |

FOREIGN PATENT DOCUMENTS

DE          33 30 221 A1      3/1985

* cited by examiner

*Primary Examiner*—D. Glenn Dayoan
*Assistant Examiner*—Gregory A. Blankenship
(74) *Attorney, Agent, or Firm*—Oliff & Berridge, PLC

(57) ABSTRACT

The invention relates to an assemblage of two pieces of bodywork each having a flange for coming into contact with the flange of the other piece, the flange of a first piece having a slot while the flange of a second piece carries a tenon presenting an engagement shape and extending towards the first piece. The assemblage also a fastener member for taking up a position against the flange of the first piece and which has an engagement shape complementary to that of the tenon so as to engage therewith. The invention also provides a piece of bodywork belonging to such an assemblage.

15 Claims, 5 Drawing Sheets

ASSEMBLAGE OF TWO PIECES OF BODYWORK TO BE JOINED TOGETHER EDGE TO EDGE, AND A PIECE OF BODYWORK BELONGING TO SUCH AN ASSEMBLAGE

The present invention relates to an assemblage of two pieces of bodywork for joining together edge to edge, and to a piece of bodywork belonging to such an assemblage.

It is known that pieces of bodywork are requiring ever more accurate positioning relative to each other in order to ensure satisfactory appearance for a vehicle.

For this purpose, various solutions have already been devised which consists in fixing each piece of bodywork accurately to the structure of the vehicle, while taking care that adjacent pieces of bodywork benefit along their contiguous edges from fixing points that are adjacent or even identical.

The fixings used in such solutions must be relatively strong since they serve both to support the pieces of bodywork and to ensure relative positioning thereof.

As a general rule, those fixings are constituted by fittings, often made of metal, thus giving rise to problems of cost, both in terms of supplies and in terms of labor.

Such fittings are put into place individually, and that means that each location receiving such a fitting must be accessible.

In principle there is no difficulty in accessing the flanges of pieces of bodywork so long as they are not already mounted on a vehicle. In contrast, once they have been mounted, fixing them together generally turns out to be much more difficult and requires operations to be performed that are lengthy and fiddly.

The present invention seeks to provide a novel assemblage of two pieces of bodywork which can be assembled together simply and quickly, even when accessibility is poor, and which ensures that the two pieces of bodywork are positioned relative to each other with great accuracy.

The present invention provides an assemblage of two pieces of bodywork each having a flange for coming into contact via its outside face with the flange of the other piece, the assemblage being characterized in that the flange of a first one of the pieces includes a slot passing through the thickness of the flange to its inside face, while the flange of a second one of the pieces carries a tenon having an engagement shape and extending towards the first piece, the tenon being suitable for penetrating into said slot so as to project from the inside face of the flange of the first piece, the assemblage further comprising a fastener member which is suitable for positioning against the inside face of the flange of the first piece and which has an engagement shape complementary to that of the tenon for engaging therewith.

It will be understood that the invention provides simple means for uniting the facing edges of the two pieces in a manner that is simultaneously strong, simple, and fast.

The engagement shapes of the fastener member and of the tenon(s) of the second piece must serve to retain the tenons against traction in a direction opposite to the direction in which they are inserted into the slots of the first piece. For example, in a preferred embodiment, the engagement shapes are of T-shaped section.

In a particular embodiment, the first piece has a plurality of slots and the second piece has a plurality of tenons positioned to be in register with the slots when the two pieces are brought together.

The slots and the tenons are distributed along the flanges that are to be assembled together, as a function of the mechanical stresses that the assemblage is to withstand.

Advantageously, the tenon(s) and the fastener member engage in a direction that is substantially parallel to the flanges.

In this manner, the fastener member can be engaged with the tenons "blind", i.e. without the operator being able to see the tenons, but merely because the fastener member is properly positioned at the beginning of its engagement stroke parallel to the flanges.

In an advantageous variant, the first piece has guide shapes on the inside face of its flange, which guide shapes support the fastener member over an appropriate stroke along the flanges of the pieces to enable it to engage the tenons. Under such circumstances, it is easier to move the fastener member blind, thus enabling it to be put into place on flanges having very poor accessibility, for example having only one end that is accessible, with the remainder of said flanges being inaccessible.

This applies in particular when connecting a fender to a bumper, with the fastener member then being inserted via the wheel arch by moving it upwards, with the assembled-together flanges of the fender and the bumper then being inaccessible over their entire height.

If in addition, the tenons and the fastener member are arranged in such a manner that said fastener member is engaged with all of the tenons simultaneously, then it will be understood that it is particularly easy and quick to put the fastener member into place and that the two pieces of bodywork can be fastened together thereby, merely by means of a single stroke in translation.

In another advantageous variant, compatible with the preceding variant, the fastener member is suitable for taking up not only an engaged position with the tenons, but also a pre-engagement position in which it is located against the inside face of the flange of the first piece but is not yet engaged with the tenons, transfer from said pre-engagement position to the engagement position being performed by moving the member in translation along a stroke slightly longer than the engagement length of the tenons.

Thus, the fastener member can be put in the pre-engagement position on the first piece even before the two pieces of bodywork are brought together.

In a particular embodiment of the invention, one of the pieces has centering orifices positioned in precise manner in its flange, and the other piece has centering pegs for engaging with little clearance in said centering orifices.

According to other particular features of the invention:
- at least one of the pieces of bodywork, and preferably the first piece, i.e. the piece carrying the tenons, is made of a plastics material;
- the fastener member is made of plastics material; and
- the centering studs are provided on a piece of bodywork that is made of plastics material.

The invention also provides a piece of bodywork having a flange for coming into contact with the flange of another piece of bodywork, and characterized in that it carries a tenon presenting an engagement shape projecting from its flange.

In order to facilitate understanding the invention, embodiments are described below as non-limiting examples, and with reference to the accompanying drawings, in which:

FIG. 1 shows a portion of two pieces of bodywork, namely a rear fender 1 and a rear bumper 2.

The fender 1 is made of sheet metal and the bumper 2 is made of plastics material.

Figure 1:
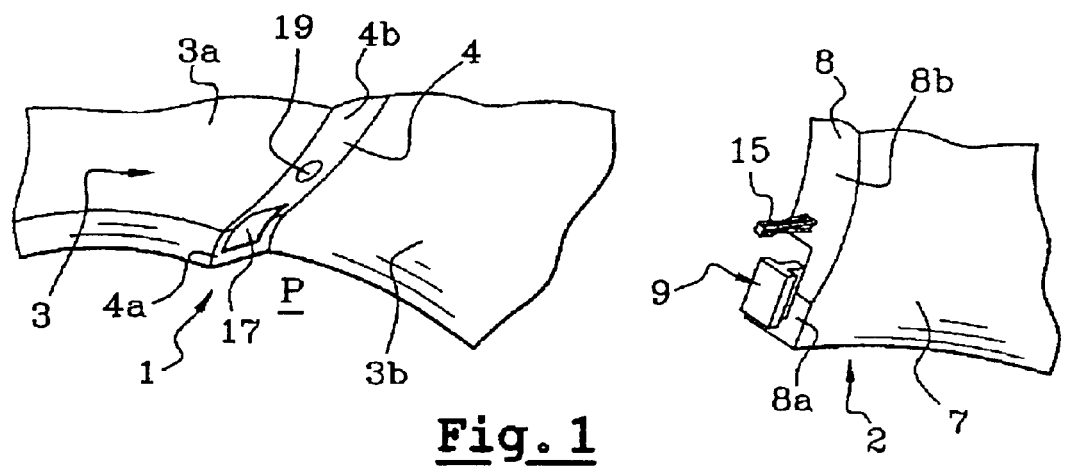
FIG. 1 is a fragmentary view of a bodywork fender and a bumper element.

The fender 1 has a wall 3 presenting a flange 4 used for assembly with the bumper 2, formed by a step between a visible region 3a of the wall 3 situated to the left of the step in FIG. 1, and a region 3b of the wall 3 situated to the right of the step in FIG. 1 and intended to be overlaid by the bumper 2 when the bumper and the fender 1 are assembled together.

The flange 4 is substantially perpendicular to the regions 3a and 3b of the wall 3.

Figure 3:
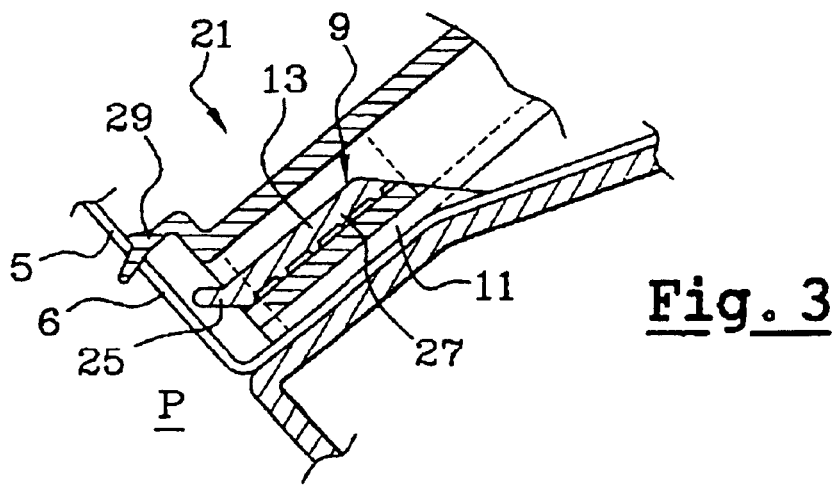
FIG. 3 is a view on a larger scale of portion III of FIG. 2.
Figure 5:
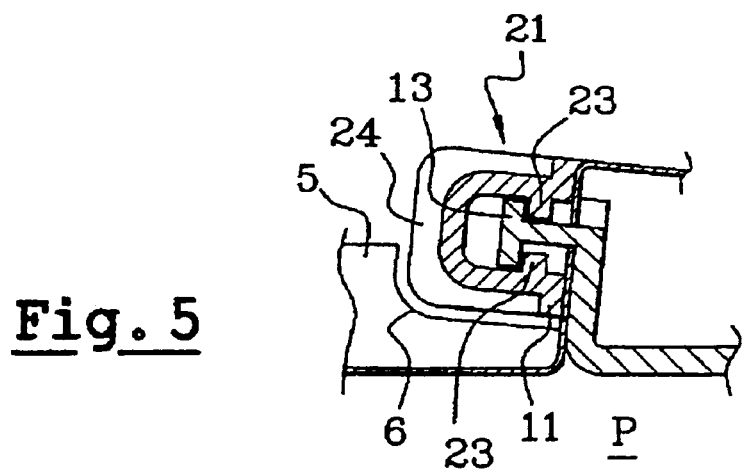
FIG. 5 is a section view on V—V of FIG. 2.

As can be seen in particular in FIGS. 3 and 5, the fender 1 has a rim 5 beside a wheel arch P, said rim extending towards the inside of the vehicle.

The rim 5 is pierced by an opening 6 whose function is described below.

The bumper 2 has a wall 7 that substantially continues the region 3a of the fender 1 when the bumper 2 and the fender 1 are assembled together, and a flange 8 for assembly with the fender 1, the flange being formed by a rim extending substantially perpendicularly to the wall 7.

The flange 8 is shaped so as to bear against the flange 4 of the fender 1.

When the flange 4 has a plane portion 4a and a curved portion 4b, then the flange 8 presents a plane portion 8a for bearing against the plane portion 4a and a curved portion 8b adapted to match the shape of the curved portion 4b.

Thus, when the fender and the bumper are assembled together, they meet in continuous manner by the shapes of their flanges 4 and 8 matching, independently of the technique used for fastening them together.

The flange 8 carries two tenons 9 and 10 each of generally T-shaped section, the tenon 9 being closer to the wheel arch P while the tenon 10 is situated at the end of the curved portion 8b that is furthest from the plane portion 8a.

The tenons 9 and 10 have respective webs 11 and 12 extending perpendicularly to the flange 8, and respective transverse walls 13 and 14 at the ends of the corresponding webs 11 and 12 and extending perpendicularly thereto.

The flange 8 also carries two centering pegs 15 and 16, each in the vicinity of a corresponding one of the tenons 9 and 10.

The flange 4 has two slots 17 for receiving the two tenons 9 and 10 and it has two centering orifices 19 for receiving the pegs 15 and 16, and of dimensions adapted to the dimensions of the pegs so that once they have been brought together, the fender 1 and the bumper 2 are prevented from moving in the plane of contact between the curved portions 4b and 8b.

To hold the pegs 15 and 16 engaged in the orifices 19 and to keep the portions 4b and 8b together, a fastener member 21 is engaged on the tenons 9 and 10 through the opening 6.

Figure 6:
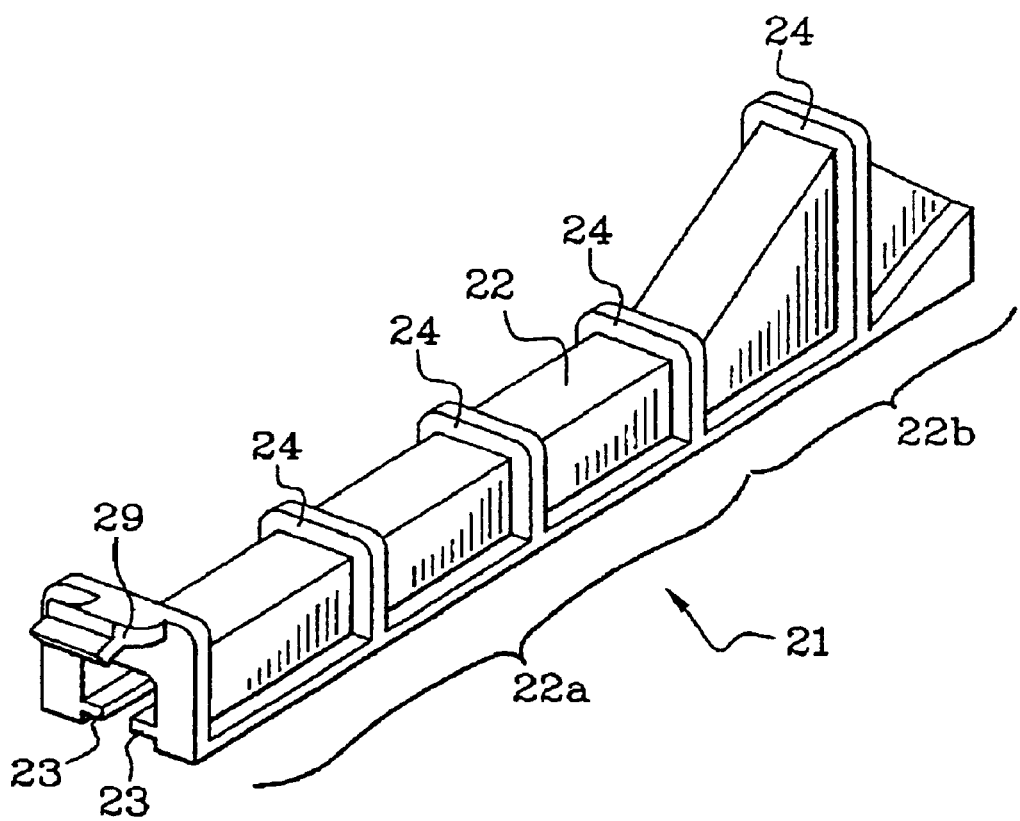
FIG. 6 is a perspective view of the fastener member shown on its own.

This fastener member 21, more clearly visible in FIG. 6, comprises a rigid elongate body 22 of inwardly-open cross-section.

Figure 2:
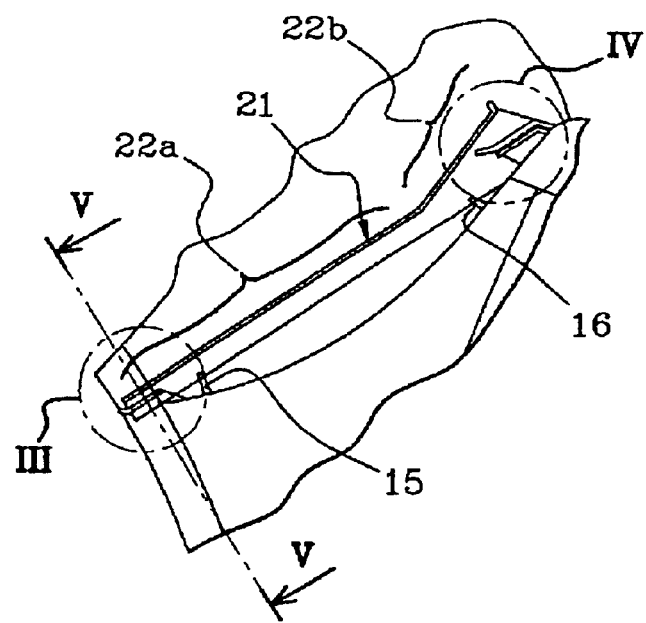
FIG. 2 is a section view showing the assembled-together flanges of the fender and of the bumper.

As can be seen in FIGS. 2 and 6, the elongate body 22 has a rectilinear portion 22a extended by a flared portion 22b for following the curve of the flanges 4 and 8.

As can be see in FIG. 6, the elongate body 22 is of generally channel section with two side flanges whose ends carry retaining ribs 23 directed towards each other so as to narrow the slot of the channel section.

As shown in FIG. 5, level with the retaining ribs 23, the transverse wall 13 of each tenon is received inside the channel section and its web 11 is clamped between the two retaining ribs 23 so that the tenon is held captive in the fastener member.

The retaining ribs 23 do not extend over the entire length of the fastener member, but are restricted to those regions which correspond to the tenons and the slots provided in the two pieces of bodywork, as can be seen in FIG. 2.

Outer reinforcing ribs 24 are placed at various locations along the length of the elongate body 22 to reinforce it against possible splaying apart of the two branches of its channel section.

In a variant (not shown), the reinforcing ribs can be omitted, if the fastener member that is put in place against the flange of the first piece of bodywork is prevented from splaying apart by abutments secured to said first piece of bodywork. Such abutments can also be used for guidance purposes when fitting the fastener member, as described below.

The transverse walls 13 and 14 of the tenons have respective raised edges 25 and 26 at their ends pointing towards the wheel arch P, so as to make it easier to engage the retaining ribs 23 beneath the transverse walls 13, 14.

The transverse walls 13 and 14 also have projections 27 on the same side as the webs 11 and 12, serving to reduce the areas of contact between said transverse walls and the retaining ribs so as to reduce friction when putting the fastener member into place.

Figure 4:
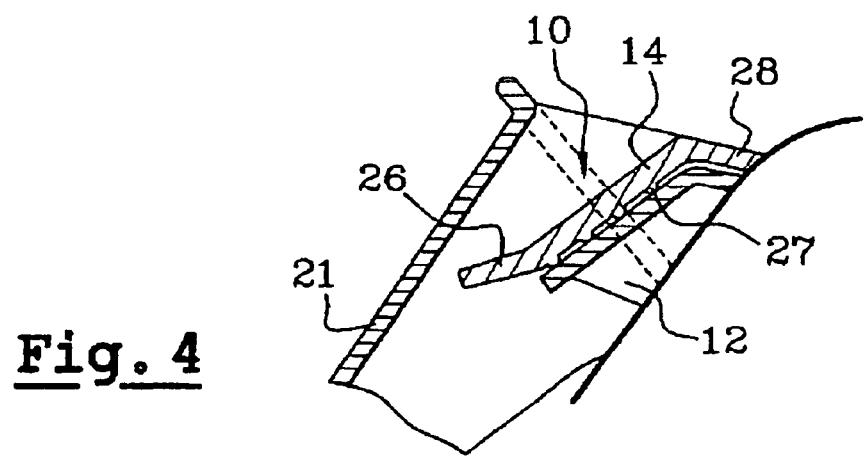
FIG. 4 is a view on a larger scale of portion IV of FIG. 2.

FIG. 4 shows that the transverse wall 14 of the tenon 10 is connected to the flange 8 on its side remote from the wheel arch P by a sloping extension 28 serving as an abutment for the fastener member 21.

Once said fastener member 21 has been put into place by being moved in longitudinal translation through the opening 6 in the flat 5 of the fender, it is held in position by means of a resilient tab 29 formed at the end of said resilient member in the vicinity of the wheel arch. This resilient tab 29 bears against the cutout of the opening 6, as can be seen in FIG. 3, and can be deformed so as to release the fastener member 21 in order to disassemble the two pieces of bodywork.

Figure 7:
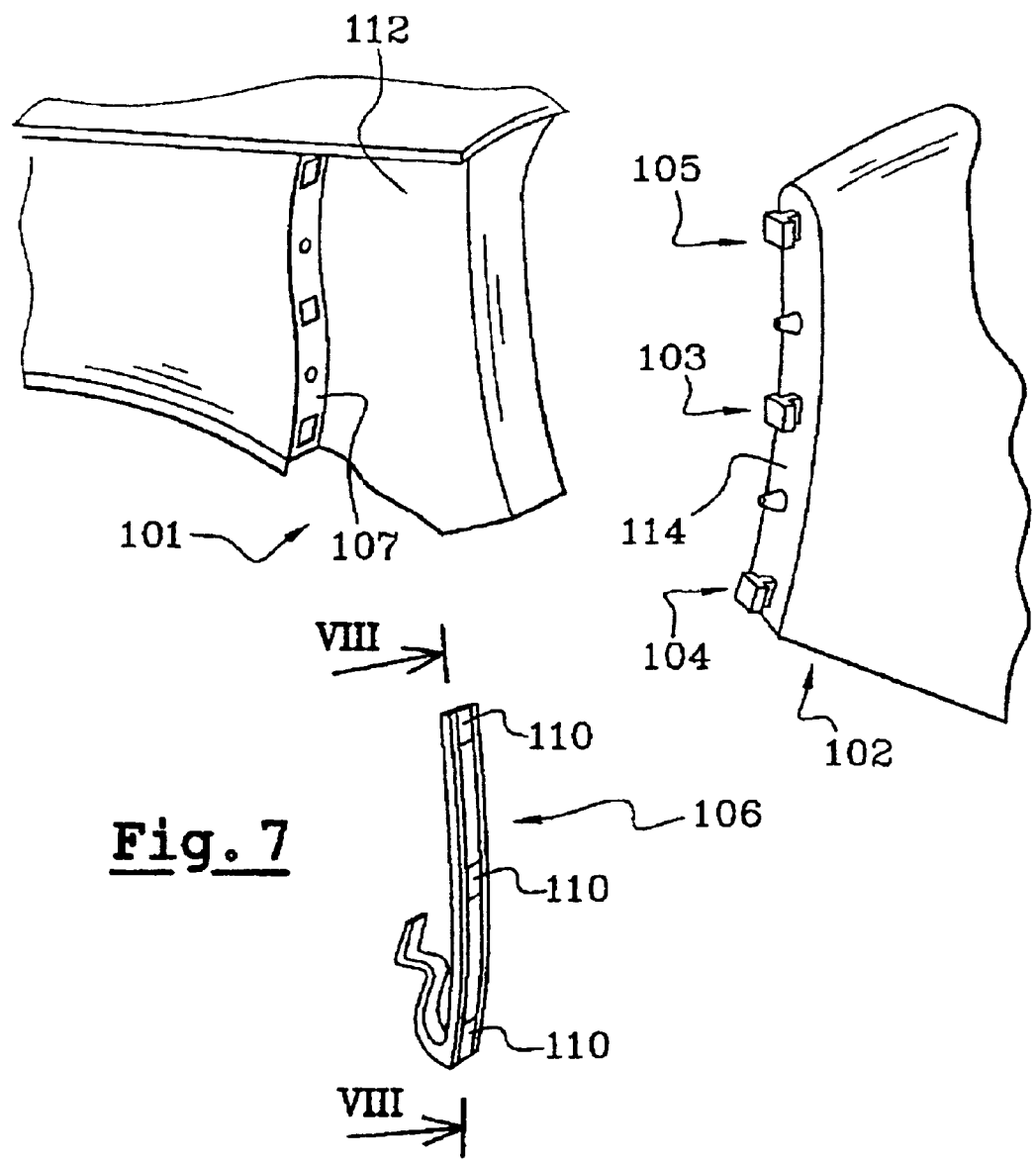
FIG. 7 is an overall view of the fender, the bumper, and the fastener member in another embodiment.
Figure 8:
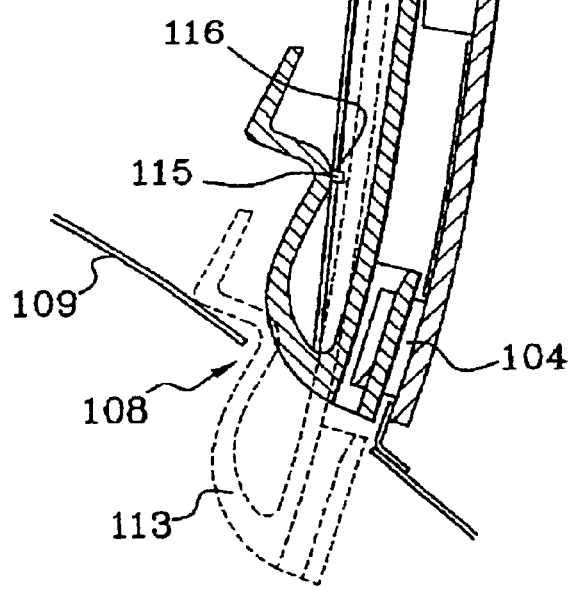
FIG. 8 is a section view on VIII—VIII of FIG. 7 showing the fastener member being put into place on the flanges.
Figure 9:
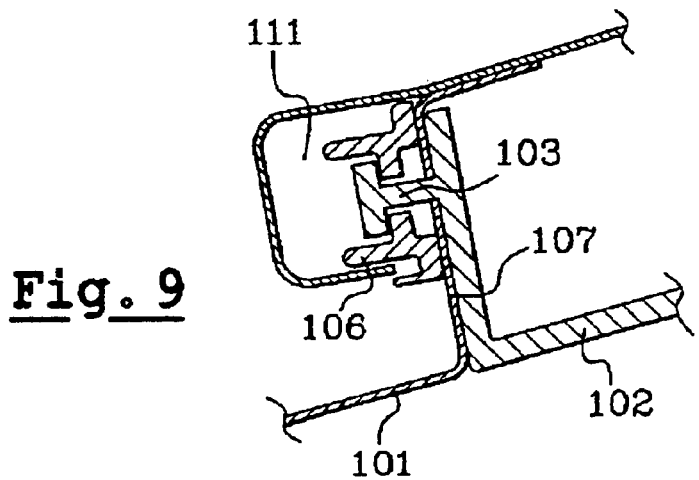
FIG. 9 is a section on IX—IX of FIG. 8.

In the embodiment shown in FIGS. 7 to 9, there can be found the same component parts for the fender 101 and the bumper 102.

In this example, there are three tenons, a central tenon 103 being added between the end tenons 104 and 105. The fastener member 106 is a substantially rectilinear section member which engages behind the flange 107 of the fender via an opening 108 formed through the fender rim 109 beside the wheel arch, as can be seen in FIG. 8.

This section member is made of molded plastics material and comprises three pairs of retaining ribs 110 disposed in positions that correspond to the three tenons 103, 104, and 105 of the bumper.

In order to receive the fastener member and in order to guide it while it is being inserted from the wheel arch, the fender 101 has a longitudinal channel 111 formed by an extension folded into a U-shape behind the flange 107 of its wall 112 that is to be covered by the bumper.

In addition to its guidance function, the longitudinal channel 111 performs a support function, preventing the section member 106 from splaying open under the effect of traction exerted by the tenons. There is therefore no need to provide reinforcing ribs on the outside of the section member 106 like the ribs 24 in the embodiment described above.

In this embodiment, the fastener member can be placed in a pre-mounted position also referred to as a "pre-engagement" position (shown in fine lines in FIG. 8), where it is located against the inside face of the flange 107 but is not yet engaged with the tenons. The fastener member is moved from its pre-engagement position to its engaged position (shown in solid lines in FIG. 8) by being moved in translation over a stroke that is slightly longer than the engagement length of the tenons.

This facility for pre-mounting the fastener member 106 in the fender provides the advantages both of making the operation of engagement faster and of facilitating longitudinal insertion of the fastener member, since the member is not impeded by the presence of the tenons at the time of pre-engagement.

In order to be retained in its pre-engagement position, the fastener member has a resilient tab 113 at its rear end (i.e. situated beside the wheel arch) which deforms so as to penetrate into the opening 108 and prevents said fastener member from escaping under the effect of its own weight once it has gone past the opening.

The fastener member is retained in its engaged position by a stud 115 which penetrates into a hole 116 provided in a suitable location in the sheet metal defining the channel 111.

In order to disassemble the bumper, the fastener member is pulled downwards by taking hold of its resilient tab 113 so as to disengage the stud 115 and bring said resilient tab against the rim 109, the fastener member then again being in its pre-engagement position.

In a variant (not shown), a plug is applied to the opening 108 and its snap-fastening can serve to retain the fastener member in the engaged position.

In the example of FIGS. 7 to 9, small amounts of curving in the flanges 107 of the fender and 114 of the bumper are accommodated by deformation of the fastener member 106, which can be provided for this purpose with zones of reduced thickness that form hinges, or indeed with co-molded zones that are made of a flexible material and that performs the same hinge function.

Naturally, the embodiments described above are not limiting in any way, the scope of the invention being defined by the accompanying claims.

In particular, it can be observed that the relatively simple shape of the first piece of bodywork makes it possible for it to be made out of sheet metal and for it to be assembled with a second piece of bodywork that is made out of plastics material, using the assembly technique of the invention.

What is claimed is:

1. An assemblage, comprising:
   two pieces of bodywork each having a flange for coming into contact via its outside face with the flange of the other piece, the flange of a first one of the pieces including a slot passing through the thickness of the flange to its inside face, while the flange of a second one of the pieces carries a tenon having an engagement shape and extending towards the first piece, the tenon being suitable for penetrating into said slot so as to project from the inside face of the flange of the first piece, the assemblage further comprising a fastener member which is suitable for positioning against the inside face of the flange of the first piece and which has an engagement shape complementary to that of the tenon for engaging therewith.

2. An assemblage according to claim 1, in which the engagement shapes present a T-shaped section.

3. An assemblage according to claim 1, in which the first piece has a plurality of slots and in which the second piece has a plurality of tenons positioned to be in register with the slots when the two pieces are brought together.

4. An assemblage according to claim 3, in which the tenon(s) and the fastener member engage in a direction that is substantially parallel to the flanges.

5. An assemblage according to claim 1, in which the first piece has guide shapes on the inside face of its flange, said guide shapes support the fastener member over an appropriate stroke along the flanges of the pieces to enable it to engage the tenon.

6. An assemblage according to claim 4, in which the tenons and the fastener member are arranged in such a manner that said fastener member is engaged with all of the tenons simultaneously.

7. An assemblage according to claim 1, in which the fastener member is suitable for taking up not only an engaged position with the tenon, but also a pre-engagement position in which it is located against the inside face of the flange of the first piece but is not yet engaged with the tenon, transfer from said pre-engagement position to the engagement position being performed by moving the member in translation along a stroke slightly longer than the engagement length of the tenon.

8. An assemblage according to claim 1, in which one of the pieces has centering orifices positioned in precise manner in its flange, and the other piece has centering pegs for engaging with little clearance in said centering orifices.

9. An assemblage according to claim 1, in which at least one of said pieces has an opening at the end of its flange for engaging the fastener member.

10. An assemblage according to claim 1, in which at least one of the pieces of bodywork is made of plastics material.

11. An assemblage according to claim 1, in which the fastener member is made of plastics material.

12. An assemblage according to claim 1, in which one of the pieces is a fender and the other is a bumper element.

13. A piece of bodywork, comprising:
    a flange for coming into contact with a flange of a second piece of bodywork, and carrying a tenon presenting an engagement shape, this tenon projecting from its flange and being suitable for penetrating into a slot passing through the second piece of bodywork, from a first side of the second piece of bodywork to a second side of the second piece of bodywork and engaging a fastener member placed on the second side of the second piece of bodywork.

14. A bodywork fender, comprising:
    the piece of bodywork claimed in claim 13.

15. A bumper element, comprising:
    the piece of bodywork claimed in claim 13.

* * * * *